United States Patent [19]

Zeiser et al.

[11] Patent Number: 4,889,172
[45] Date of Patent: Dec. 26, 1989

[54] ANTI-SKID DEVICE FOR VEHICLE WHEELS

[75] Inventors: Peter Zeiser, Aalen-Wasseralfingen; Helmut Kaiser, Aalen-Hofherrnweiler; Hansjörg Rieger, Aalen, all of Fed. Rep. of Germany

[73] Assignee: RUD-Kettenfabrik Rieger & Dietz GmbH, u. Co., Aalen, Fed. Rep. of Germany

[21] Appl. No.: 216,283

[22] Filed: Jul. 7, 1988

[30] Foreign Application Priority Data

Jul. 8, 1987 [DE] Fed. Rep. of Germany ....... 3722900

[51] Int. Cl.⁴ .............................................. B60C 27/20
[52] U.S. Cl. .................................... 152/226; 152/244
[58] Field of Search ................... 152/208, 213 R, 221, 152/222, 223, 224, 225 R, 226, 228, 231, 233, 239, 242, 243, 244, 179; 59/93

[56] References Cited

U.S. PATENT DOCUMENTS

| 4,262,723 | 4/1981 | Bourcier de Caron de Previnquieres | 152/222 |
| 4,271,887 | 6/1981 | Holzwarth et al. | 152/220 |
| 4,275,781 | 6/1981 | Riedel | 152/223 |
| 4,357,975 | 11/1982 | Baldry | 152/223 |
| 4,550,757 | 11/1985 | Berchem | 152/228 |

FOREIGN PATENT DOCUMENTS

| 348885 | of 1979 | Australia . |
| 2846909 | of 1980 | Fed. Rep. of Germany . |
| 2910084 | of 1980 | Fed. Rep. of Germany . |
| 3239099 | of 1984 | Fed. Rep. of Germany . |
| 854645 | of 1940 | France . |

Primary Examiner—Michael W. Ball
Assistant Examiner—Gregory J. Wilber
Attorney, Agent, or Firm—Mark P. Stone

[57] ABSTRACT

In an anti-skid device for vehicle wheels the tread network is formed by components (5) made of rubber or plastic and chain strand sections (3,4) mutually connecting the latter. The components (5) consists of longitudinal pieces (10 and 11) substantially aligned with the chain strand sections (3,4) arranged in the region of the shoulders of a tire fitted onto a vehicle wheel and X-shaped distance elements (12) retaining said longitudinal pieces at a mutual distance. The longitudinal pieces (10,11) are equipped with spikes (7) in the region of projections (6) of high relief construction.

28 Claims, 4 Drawing Sheets

ANTI-SKID DEVICE FOR VEHICLE WHEELS

BACKGROUND OF THE INVENTION

The invention relates to an anti-skid device for vehicle wheels having chain strand sections arranged juxtaposed in pairs and at a mutual interval considered in the direction of the wheel circumference and components connected to the sections and distributed around the wheel circumference, each of which exhibits a plurality of projections forming anti-skid elements.

In an anti-skid device of the above-mentioned type known from DE-OS No. 3,239,099 the components provided with anti-skid elements consist of forged oval steel rings having transverse bars and longitudinal bars arranged at right angles to the plane of the ring. Both the transverse bars and also the longitudinal bars have a wedge-shaped self-sharpening cross-section, and two parallel transverse bars and two parallel longitudinal bars are associated with each steel ring. In this construction the parallel transverse bars are located in the region of the tread of the vehicle wheel, whereas the parallel longitudinal bars are arranged outside the tread region and serve to enlarge the standing surface of the vehicle wheel. The known construction cannot give complete satisfaction inasmuch as the material constitution and the shape of its components provided with anti-skid elements make quiet running of the vehicle wheel equipped with it impossible. A similar comment applies to an anti-skid device of similar construction known from FR-PS No. 854,645, of which the components provided with projections forming anti-skid elements consist of plates having transverse bars and longitudinal bars arranged at right angles to the plane of the plate.

Quieter running is made possible by an anti-skid device made of rubber or plastic, likewise known and disclosed in DE-OS No. 2,910,084, in which chain strand sections in the region of the tread of the vehicle wheel are omitted. The omission of chain strand sections in the tread network impairs the lateral guidance properties and the articulation of the known anti-skid device. The anti-skid elements of this anti-skid device, which are equipped with spikes in order to increase their grip, are arranged asymmetrically, and this arrangement has an unfavourable influence upon the steering behaviour of the vehicle during sharp braking.

AT-PS No. 348,885 discloses a more favourable anti-skid device having a substantially symmetrical distribution of anti-skid elements and spikes. This anti-skid device consists of components engaging stirrup-fashion around a vehicle tyre, which are retained by side chains or similar support means like the transverse chain strands of a ladder chain. However, the arrangement of the components of this anti-skid device like ladder rungs likewise leaves something to be desired as regards both lateral guidance and travelling comfort.

Lastly, a tire chain in which support elements consisting of rubber or plastic are retained by a self-contained chain network is known from DE-OS No. 2,846,909. In this case the support elements do not perform an anti-skid function, but merely serve to enlarge the standing surface of a vehicle wheel.

SUMMARY OF THE INVENTION

The underlying object of the invention is to provide an anti-skid device suitable particularly for use on motor cars, which provides good anti-skid properties both on icy and on snowy roads, and is characterized by very quiet running. This object is achieved according to the invention in that the components and their projections consist of a flexible material, particularly rubber or plastic, that the projections are of stud-shaped construction and at least some of them, considered in the direction of the wheel circumference, are arranged approximately aligned with the chain strand sections which come to lie in the region of the tread of the vehicle wheel in the assembled state, that the outside width of the links of the chain strand sections is at least approximately equal to the height of the components in the region of their projections, that the projections exhibit surface sections facing the road when the anti-skid device is fitted, the interval of which from the tread of the vehicle wheel substantially equals the interval from the thread of the crest lines facing the road of the longitudinal members of vertical links of the chain strand sections, and that the components or their projections are fitted with spikes protruding beyond the projections.

In the anti-skid device according to the invention the chain strand sections and the anti-skid elements arranged substantially aligned with them in the direction of the wheel circumference counteract a veering of a vehicle equipped with the anti-skid device according to the invention. Due to the alternation of chain strand sections and components consisting of rubber or plastic with anti-skid elements, not only is good adaptability of the anti-skid device to the vehicle wheel ensured, but the folding and storage of the anti-skid device is also facilitated. The equipment of the components carrying anti-skid elements with spikes considerably improves the anti-skid properties on an icy road. Because the outside width of the chain links and the height of the nonmetallic anti-skid elements are equal, quiet running is obtained. On a dry road quiet running is promoted by the fact that the components made of rubber or plastic arranged between the chain strand sections have a noise-suppressing effect. Moreover, they improve the static friction conditions between wheel and dry road, whereas the spikes protect both the components and also the chain strand sections from undesirably high wear.

BRIEF DESCRIPTION OF THE DRAWINGS

Further particulars and features of the anti-skid device according to the invention will appear from the subordinate claims and from the description given below of preferred exemplary embodiments illustrated in the accompanying drawing, wherein;

DISCUSSION OF THE BEST MODES FOR CARRYING OUT THE INVENTION

Figure 1:
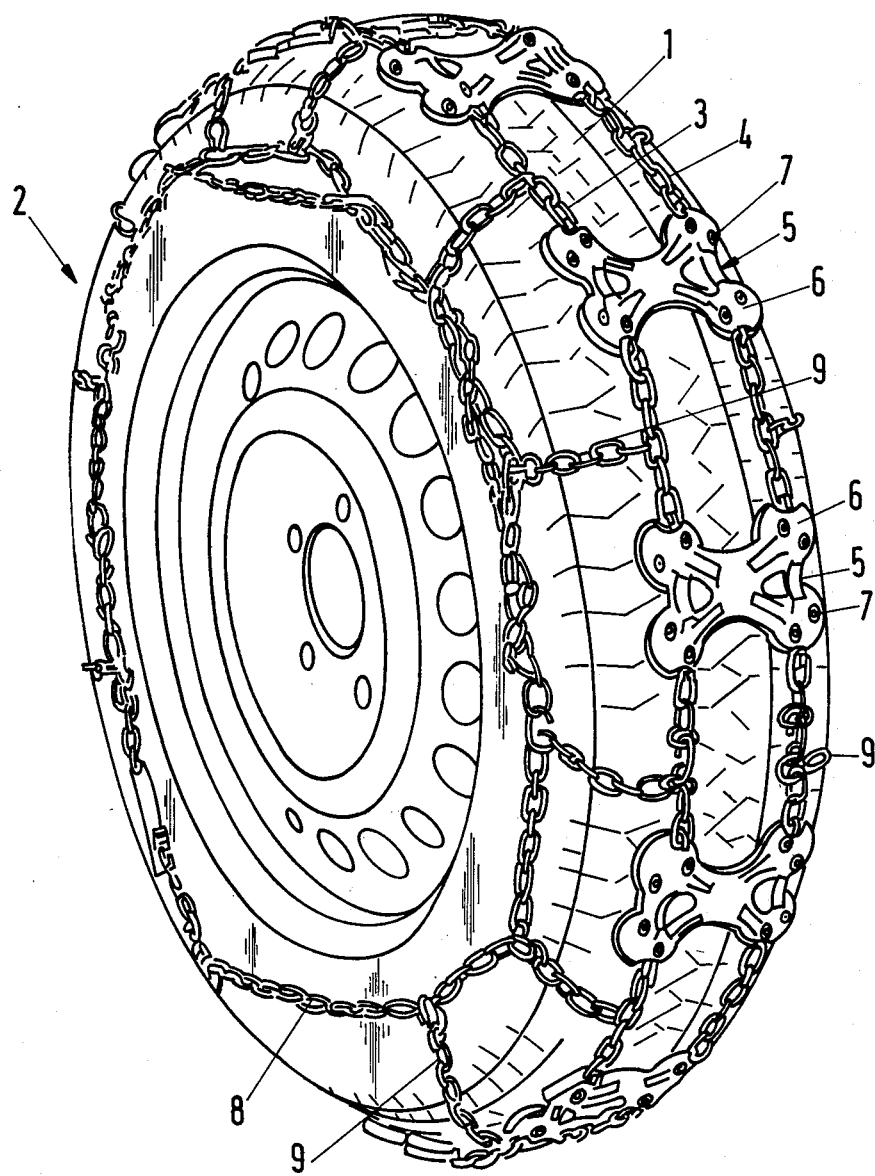
FIG. 1 shows a perspective view of an anti-skid device fitted on a vehicle wheel.

In FIG. 1, 1 is the tread of a vehicle wheel 2, onto which an anti-skid device has been fitted. The anti-skid device consists of chain strand sections 3 and 4 arranged juxtaposed in pairs, which extend mutually parallel in the region of the shoulders of the tire fitted onto the vehicle wheel 2 in order to achieve good track-keeping properties. Components 5 made of rubber or plastic, which are arranged between the chain strand sections 3 and 4, exhibit anti-skid elements formed by high relief projections 6 and are equipped with spikes 7 in the region of their projections 6. The spikes 7 embedded into the components 5 not only reduce the wearing load on the components 5 and the chain strand sections 3 and 4, but they also definitely improve the anti-skid properties of the device on an icy road. The tread network consisting of the components 5 and the chain strand sections 3 and 4 is maintained by side chains 8, to which the chain strand sections 3 and 4 are connected by short chain strand pieces 9. Due to the fact that the components 5 form distance elements which retain the parallel chain strand sections 3, 4 in the region of the shoulders of the tire fitted onto the vehicle wheel 2, that is to say in the region of greatest compressive stress, transverse chain strands can be omitted. This has a positive effect inasmuch as experience shows that the wear on tread networks of customary anti-skid chains is greatest in the centre of the tread network.

Figure 2:
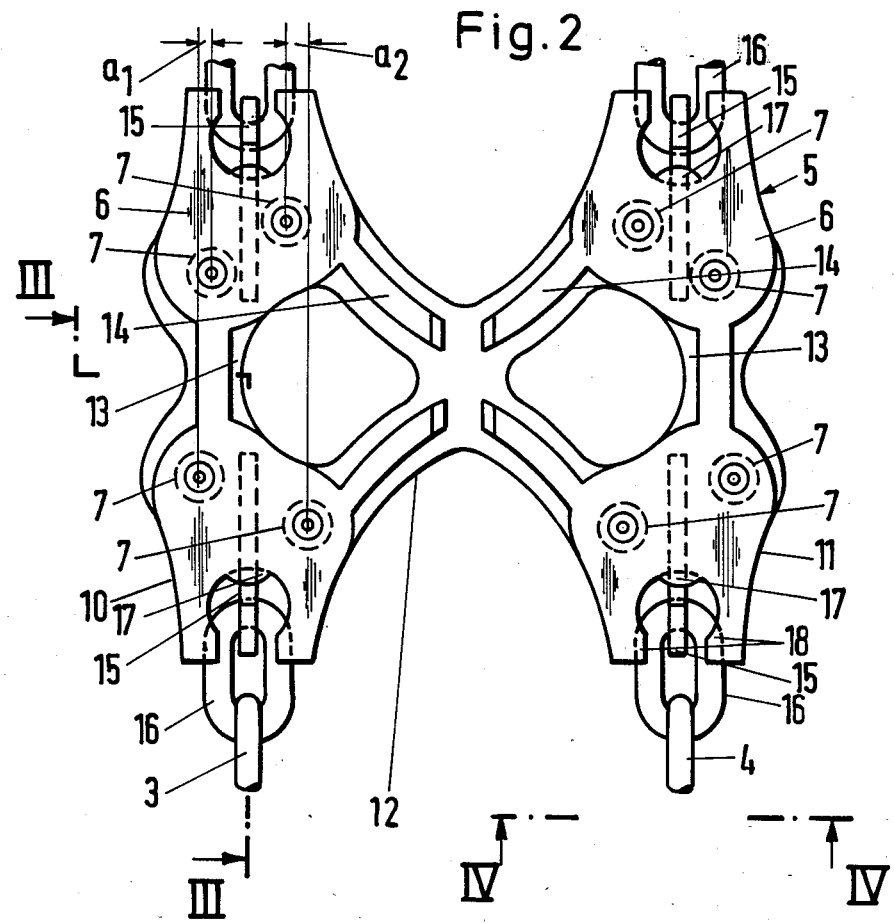
FIG. 2, shows on a larger scale a partial plan of the anti-skid device according to FIG. 1.

Particulars of the construction of the components 5 will appear from the following figures. FIG. 2 shows that the component 5 consists of two longitudinal pieces 10 and 11 which are connected together by an X-shaped distance element 12 and exhibit constrictions 13 in their central region. The projections 6 extend over the entire longitudinal pieces 10, 11 and with arms 14 into the region of the distance elements 12. The X-shaped construction of the distance elements 12 free from projections in their centre and the constrictions 13 achieve a high degree of flexibility of the components 5 and thus make it possible for the components to contact the tire snugly over their entire region. This snug contact not only benefits the useful life of the components 5, but it also promotes quiet running of a vehicle equipped with the anti-skid device. Hooks 15, each for a link 16 of the chain strand sections 3 or 4 oriented parallel to the tread are embedded positively in the projections 6 at the ends of the longitudinal pieces 10 and 11. Resilient locking lugs 17 prevent the links 16 from unhooking out of the hooks 15, whereas blocking lugs 18 prevent the links 16 from swinging upwards and across.

As may be seen from FIG. 2, the longitudinal pieces 10 and 11 are arranged substantially aligned with the parallel chain strand sections 3 and 4. They form with the latter tracking rings arranged in the shoulder region of the tire fitted to the relevant vehicle wheel, that is to say in the region of the greatest ground pressure, which tracking rings counteract any lateral deviation of the vehicle. In order to ensure steering stability on the total circumference of the vehicle wheel 2 and to achieve very quiet running, the height h of the components 5 in the region of their projections 6 substantially equals the outside width $b_a$ of the links of the chain strand sections 3 and 4, disregarding drivers 19 arranged on the underside of the components 5, which counteract any undesirable slipping of the tread network relative to the tread, but do not exclude slight wandering of the anti-skid device.

The configuration of the projections 6 and particularly the arms 14 ensure adequate propulsion when the anti-skid device is used in snow. On an icy road, on the other hand, the spikes 7 acquire dominant significance for the anti-skid action to be obtained. In order to achieve an optimum anti-skid effect two spikes 7 are arranged at each of the corners of the components 5, the interval of each two consecutive spikes 7 of a component in the direction of travel being shorter on the outside of the component than on the inside of the component. It has also been found favourable for the spikes of a component 5 to be mutually staggered transversely by amounts $a_1$ and $a_2$ considered in the direction of the wheel circumference.

Figure 3:
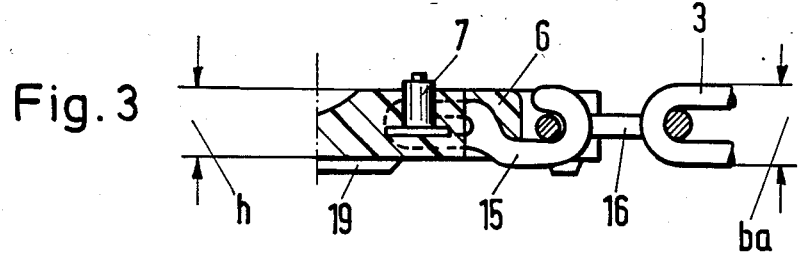
FIG. 3 shows a section made along the line III—III in FIG. 2.
Figure 4:
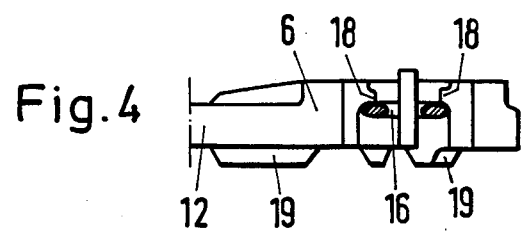
FIG. 4 shows a view in the direction of the arrows IV—IV in FIG. 2.
Figure 5:
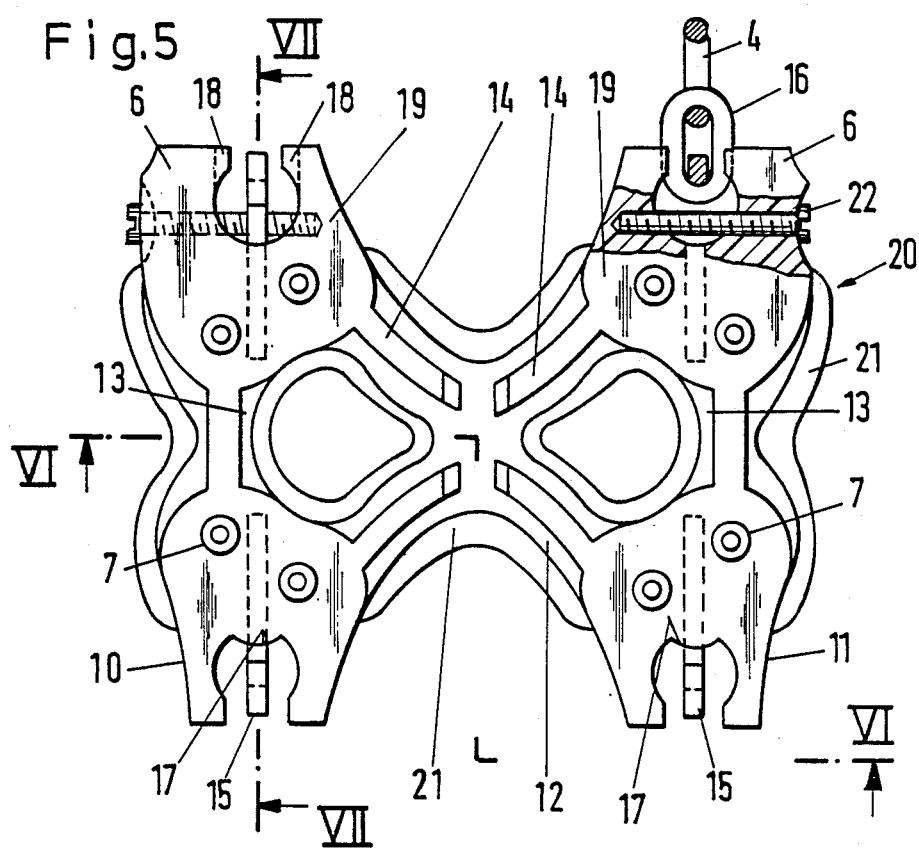
FIG. 5 shows a plan corresponding to FIG. 2 of a component which permits a link-by-link shortening of chain strand sections.
Figure 6:
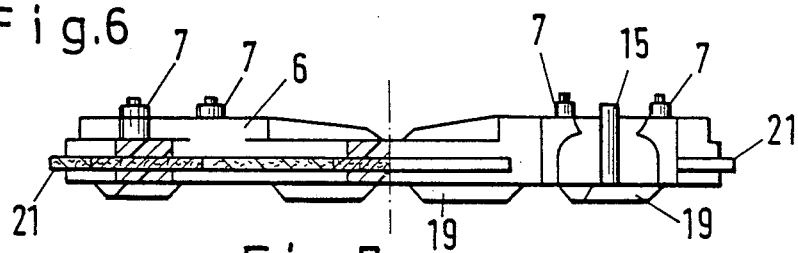
FIG. 6 shows a section made along the line VI—VI in FIG. 5.
Figure 7:
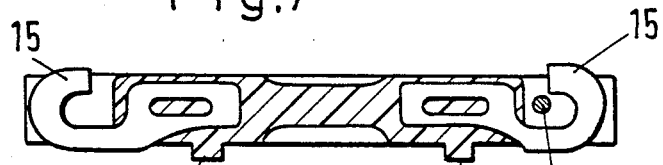
FIG. 7 shows a section made along the line VII—VII in FIG. 5.

A modified component 20 is illustrated in FIGS. 5 to 7. Parts which correspond to the parts of the components 5 according to FIGS. 2 to 4 are designated by the same reference numerals, so that it is sufficient if only the differences between the two constructions are described here. In contrast to the component 5, the component 20 is provided with a fabric inlay 21 serving to increase its strength. Also, screws 22 which have taken the place of locking lugs 17 at the one end of the longitudinal pieces 10 and 11 serve to secure the respective link 16 hooked into a component 20. The screws 22 have a multiple thread and are provided with a steep screwthread which makes rapid and easy fastening and release of links 16 in case it is desired to shorten the length of the tread network in order to adapt it to the circumference of the vehicle wheel 2. The adaptation of the anti-skid device to the wheel circumference is of considerable important for achieving an ultimum anti-skid action.

Figure 8:
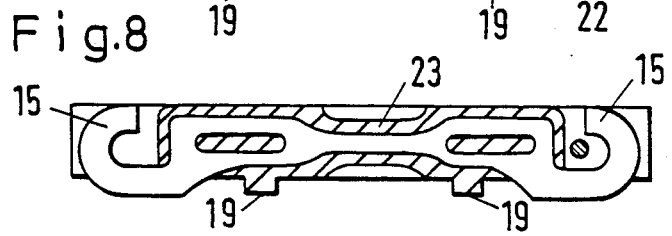
FIG. 8 shows a section corresponding to FIG. 7 through a modified exemplary embodiment.

In the case of both the component 5 and the component 20, the connection of two hooks 15 of a longitudinal piece 10 or 11 is affected by the basic material of the components and/or by the fabric inlay 21. Instead of this, it is also possible to couple the hooks 15 together, as indicated in FIG. 8, by a coupling element 23 which may be integral with the hooks or connected detachably or non-detachably to the latter. In each case the coupling element forms a bridge transmitting the tensile forces between the respective hooks 15 arranged mutually aligned.

Figure 9:
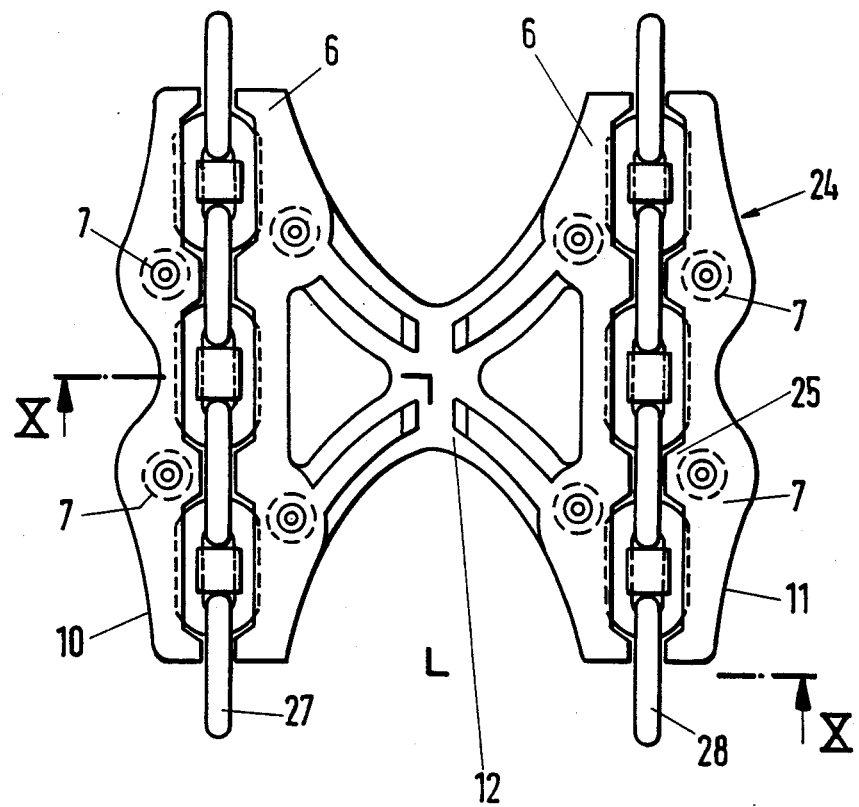
FIG. 9 shows the plan of a component of an anti-skid device with continuous chain strands and FIG. 10 shows a partial section made along the line X—X in FIG. 9.
Figure 10:
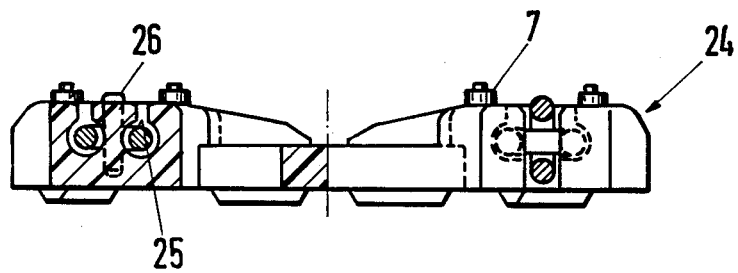

Another modified component 24 is illustrated in FIGS. 9 and 10. In the region of its longitudinal pieces 10 and 11 it is equipped with housings 25 and anchorage elements 26 for hookable links of continuous chain strands 27, 28.

In all the constructions described, the number of the links of the parallel chain strand sections 3, 4 or 27, 28 arranged between consecutive components 5, 20, 24 should be not less than three and not more than seven.

We claim:

1. Anti-skid device for vehicle wheels having chain strand sections (3, 4) which are arranged juxtaposed in pairs and at a mutual interval considered in the direction of the wheel circumference and which come to lie in the region of the tread of the vehicle wheel in the assembled state, said device further comprising components (5,20,24) connected to the sections and distributed round the wheel circumference, each of which exhibits a plurality of projections (6) forming anti-skid elements with surface sections facing the road when the anti-skid device is fitted, characterized in that the components (5,20,24) and their projections (6) are formed from a flexible material, particularly rubber or plastic, that at least some of the projections (6), considered in the direction of the wheel circumference, are arranged approximately aligned with parallel chain strand sections (3,4), that the outside width ($b_a$) of the links of the chain strand sections (3, 4) is at least approximately equal to the height (h) of the components (5,20,24) in the region of their projections (6), that the interval between the surface sections of the projections (6) and the tread of the vehicle wheel substantially equals the interval between the tread and the crest lines of the longitudinal members facing the road of vertical links of the chain strand sections (3, 4), and that the projections (6) of the components (5,20,24) are equipped with spikes (7) protruding beyond the surface sections of the projections (6).

2. Anti-skid device according to claim 1, characterized in that the components (5,20,24) comprise two longitudinal pieces (10,11) arranged in the direction of the wheel circumference and connected by a spacer element (12) arranged between said pieces (10,11).

3. Anti-skid device according to claim 2, characterized in that the longitudinal pieces (10,11) and the spacer element (12) are of integral construction.

4. Anti-skid device according to claim 2, characterized in that the spacer elements (12) are of X-shaped construction.

5. Anti-skid device according to claim 2, characterized in that the longitudinal pieces (10,11) exhibit constrictions (13).

6. Anti-skid device according to claim 2, characterized in that the projections (6) are arranged in the region of the longitudinal pieces (10,11) of the components (5,20,24).

7. Anti-skid device according to claim 1, characterized in that the components (5,20,24) and the projections (6) are of integral construction.

8. Anti-skid device according to claim 1, characterized in that the chain strand sections (3,4) and the projections (6) of the components (5) mutually connected by them are arranged in the region of the shoulders of the tires of the vehicle wheel (2).

9. Anti-skid device according to claim 1, characterized in that the chain strand sections (3,4) and the components (5,20,24) form a closed ring snugly contacting the wheel circumference.

10. Anti-skid device according to claim 9, characterized in that the circumference of said closed ring is variable.

11. Anti-skid device according to claim 1, characterized in that at least some of the components (5,20, 24) are provided with connecting elements anchored positively in the component and in its projections (6) for links (16) of the chain strand sections (3,4).

12. Anti-skid device according to claim 11, characterized in that the connecting elements are formed by hooks (15) for hooking in links (16) of the chain strand sections (3,4).

13. Anti-skid device according to claim 11, characterized in that the connecting elements of a component (5, 20,24) for each two consecutive chain strand sections (3,4) are mutually connected by coupling elements (23).

14. Anti-skid device according to claim 11, characterized in that each two consecutive chain strand sections (3,4) are mutually connected by a connecting element exhibiting hooks (15) at both its ends.

15. Anti-skid device according to claim 12, characterized in that at least some of the projections (6) form resilient locking lugs (17) for links (16) of the chain strand sections (3,4) hooked into the hooks (15).

16. Anti-skid device according to claim 12, characterized in that the links (16) of the chain strand sections (3,4) hooked into the hooks (15) form horizontal links, the longitudinal members of which are secured against pivoting upwards and across by blocking lugs (18).

17. Anti-skid device according to claim 1, characterized in that at least some chain strand sections (3,4) are formed by sections of continuous chain strands (27,28), of which the links located in the region of the components (24) are retained in housing (25) of the components (24) or by projections (6).

18. Anti-skid device according to claim 11, characterized in that at least some of the links (16) of the chain strand sections (3,4) connected to the connecting elements are secured each by a screw (22) in the hooked-in position.

19. Anti-skid device according to claim 18, characterized in that the screw (22) has a multiple thread.

20. Anti-skid device according to claim 18, characterized in that the screw (22) has a steep thread.

21. Anti-skid device according to claim 1, characterized in that two spikes (7) are arranged in the region of each of the corners of the components (5,20,24).

22. Anti-skid device according to claim 21, characterized in that the interval of each two consecutive spikes (7) of a component (5,20,24) consecutive in the direction of travel has a different size in each case.

23. Anti-skid device according to claim 21, characterized in that the interval of each two spikes (7) of a component (5,20,24) consecutive in the direction of travel is shorter on the outside of the component than on the inside of the component.

24. Anti-skid device according to claim 21, characterized in that the spikes (7) of a component (5,20,24) are mutually staggered transversely considered in the direction of the wheel circumference.

25. Anti-skid device according to claim 1, characterized in that the components (5,20,24) and the projections (6) are formed from polyurethane.

26. Anti-skid device according to claim 25, characterized in that the components (5,20,24) are reinforced by fabric inlays (21).

27. Anti-skid device according to claim 1, characterized in that the components (5,20,24) are provided with drivers (19) on their rear side.

28. Anti-skid device according to claim 1, characterized in that the chain strand sections (3,4) includes at least three and at most seven chain links.

* * * * *